(12) United States Patent
Ruth et al.

(10) Patent No.: US 8,577,530 B2
(45) Date of Patent: Nov. 5, 2013

(54) STEERING SYSTEM AND OPERATING METHOD FOR MINING TRUCK

(75) Inventors: Eric Ruth, Peoria, IL (US); Kenneth Stratton, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 46 days.

(21) Appl. No.: 13/308,804

(22) Filed: Dec. 1, 2011

(65) Prior Publication Data
US 2013/0144472 A1 Jun. 6, 2013

(51) Int. Cl.
*B60L 9/00* (2006.01)

(52) U.S. Cl.
USPC .......................................................... 701/22

(58) Field of Classification Search
USPC .......................................................... 701/22
See application file for complete search history.

(56) References Cited

U.S. PATENT DOCUMENTS

| | | | |
|---|---|---|---|
| 4,120,534 A | 10/1978 | Addison | |
| 4,476,947 A * | 10/1984 | Rynbrandt | 180/2.1 |
| 5,007,496 A | 4/1991 | Whitten et al. | |
| 6,442,456 B2 | 8/2002 | Burns et al. | |
| 2005/0178632 A1 * | 8/2005 | Ross | 191/10 |
| 2006/0265914 A1 | 11/2006 | Gudat | |
| 2010/0183422 A1 | 7/2010 | Makela et al. | |
| 2011/0094841 A1 | 4/2011 | Mazumdar et al. | |

FOREIGN PATENT DOCUMENTS

DE 10256705 7/2004

* cited by examiner

*Primary Examiner* — James Trammell
*Assistant Examiner* — Michael D Lang
(74) *Attorney, Agent, or Firm* — Liell & McNeil

(57) ABSTRACT

Operating a mining truck includes receiving data indicative of a prospective directional change in an on-trolley availability corridor, and outputting a control command to a steering mechanism of the mining truck responsive to the data. The mining truck is steered responsive to the control command from a first heading accordant with a first part of the corridor toward a second heading accordant with a succeeding part of the corridor. A related mining truck and steering system are disclosed.

18 Claims, 4 Drawing Sheets

STEERING SYSTEM AND OPERATING METHOD FOR MINING TRUCK

TECHNICAL FIELD

The present disclosure relates generally to mining trucks configured for trolley-assisted operation, and relates more particularly to controllably steering a mining truck responsive to a prospective directional change in an on-trolley availability corridor.

BACKGROUND

The large scale mining of materials tends to be an energy intensive endeavor. In many opencast mines, a fleet of large mining trucks may operate almost continuously to transport ore and overburden from an extraction area to a dump or processing site. Many such mining trucks are operated via diesel-powered engines. Both direct drive diesel engines and diesel-electric drive systems have been used over the years. As with many other heavy equipment systems, fuel costs for mining trucks can be substantial. Moreover, many mines are located in remote locations, and the costs of transporting fuel to the mine site can add significantly to the operational expense. Even obtaining sufficient fuel supplies can be challenging, regardless of cost. For these and other reasons, engineers in the mining industry and mining equipment manufacturers are continually searching for ways to reduce fuel consumption. Given the historical price volatility of commodities, of which mined materials and petroleum fuels are both examples, as well as variation in geology and topography among mine sites, the economics of supplying and consuming energy for mining activities tends to be complex and variable.

For decades mine operators have experimented with the use of electric power generated on-site or supplied from a utility grid, to power mining equipment. On-site electric power generation has similar cost and availability concerns to fueling equipment directly via petroleum fuels. Due to the remoteness of many mines and other factors, supplying electrical power from a grid, even over relatively long distances, has proven consistently advantageous for at least certain mines as compared to reliance on petroleum fuels alone. Electric power costs can nevertheless vary due to market fluctuations, as well as varying from mine to mine depending upon regional availability of fossil fuels, geothermal or hydroelectric power, or other native or obtainable sources of energy for electricity generation. Thus, even where electric powering of mining equipment is viable, there remains ample motivation to use it as efficiently as possible, both to control costs and optimize predictability in the fact of uncertain economics.

While first proposed decades ago, one contemporary example of the use of electric power at mine sites is a trolley system having an overhead trolley line to provide electrical power to assist mining trucks, particularly when traveling loaded upon uphill grades. Many opencast mines include a haul road extending from an extraction site for ore to a remote dump site or processing location. The mining trucks used at such site may need to travel an uphill grade on the haul road that is several kilometers long, or possibly even longer. It will be appreciated that the use of diesel or other petroleum fuels to propel mining trucks carrying literally hundreds of tons of ore up such grades can be quite costly, and thus trolley systems have received renewed interest in recent years.

Mining trucks configured to be assisted with electrical power from a trolley line typically include a mechanism known as a pantograph which can be used to reach upwardly and/or outwardly from a mining truck to electrically contact the trolley line, and thus provide electric power for propulsion rather than generating the power on-board the mining truck itself. In conventional practice, an operator visually monitors the proximity of their mining truck to an overhead trolley line, and actuates the pantograph to engage the trolley line at a desired location, then disengages the pantograph from the trolley line at its end. Mining truck operators are already tasked with steering and otherwise controlling what amounts to an extraordinarily large and heavy machine. Accordingly, highly skilled operators having extensive training are often selected for operating mining trucks. Despite such skill and training, operators tend to direct their attention more to avoiding obstacles and collisions than optimally timing the actuation of the pantograph. Moreover, steering a mining truck such that it remains electrically connected with the trolley line can itself be a challenging endeavor. As a result, many mining trucks are operated less often, or more conservatively, on-trolley than they optimally might be.

German Patent Number No. DE 10256705(A1) is directed to a mining vehicle having a pantograph and line sensors for determining the position of the pantograph relative to an overhead line. The '705 patent appears to propose automated steering of the vehicle based on feedback from the line sensors. While it appears that the disclosed concept is capable of reactively steering the vehicle in response to changes in line orientation, such as approach is not optimally efficient.

SUMMARY

In one aspect, a method of operating a trolley assist-capable mining truck includes receiving data indicative of a prospective directional change in an on-trolley availability corridor to be traversed by the mining truck while electrically connected with an overhead trolley line coinciding with the corridor. The method further includes outputting a control command to a steering mechanism of the mining truck responsive to the data, and steering the mining truck responsive to the control command. The mining truck is steered from a first heading accordant with a first part of the corridor preceding the directional change, toward a second heading accordant with a second part of the corridor succeeding the directional change.

In another aspect, a trolley assist-capable mining truck includes a frame, a plurality of ground engaging wheels coupled with the frame, and a steering system. The steering system includes a wheel steering mechanism and an electronic control unit in control communication with the wheel steering mechanism. The electronic control unit is configured to receive data indicative of a prospective directional change in an on-trolley availability corridor for electrically powering the mining truck via an overhead trolley line. The electronic control unit is further configured to output a control command to the wheel steering mechanism responsive to the data, such that the mining truck is steered from a first heading accordant with a first part of the corridor preceding the directional change, toward a second heading accordant with a second part of the corridor succeeding the directional change.

In still another aspect, a steering system for a trolley assist-capable mining truck includes a steering mechanism configured to adjust a wheel steering angle of the mining truck, and an electronic control unit. The electronic control unit is configured to receive data indicative of a prospective directional change in an on-trolley availability corridor, the on-trolley availability corridor being defined by a tolerance for displacement of the mining truck from an overhead trolley line. The electronic control unit is further configured to output a control command to the steering mechanism such that the mining truck is steered from a first heading toward a second heading, prior to reaching the directional change in the on-trolley availability corridor.

DETAILED DESCRIPTION

Figure 1:
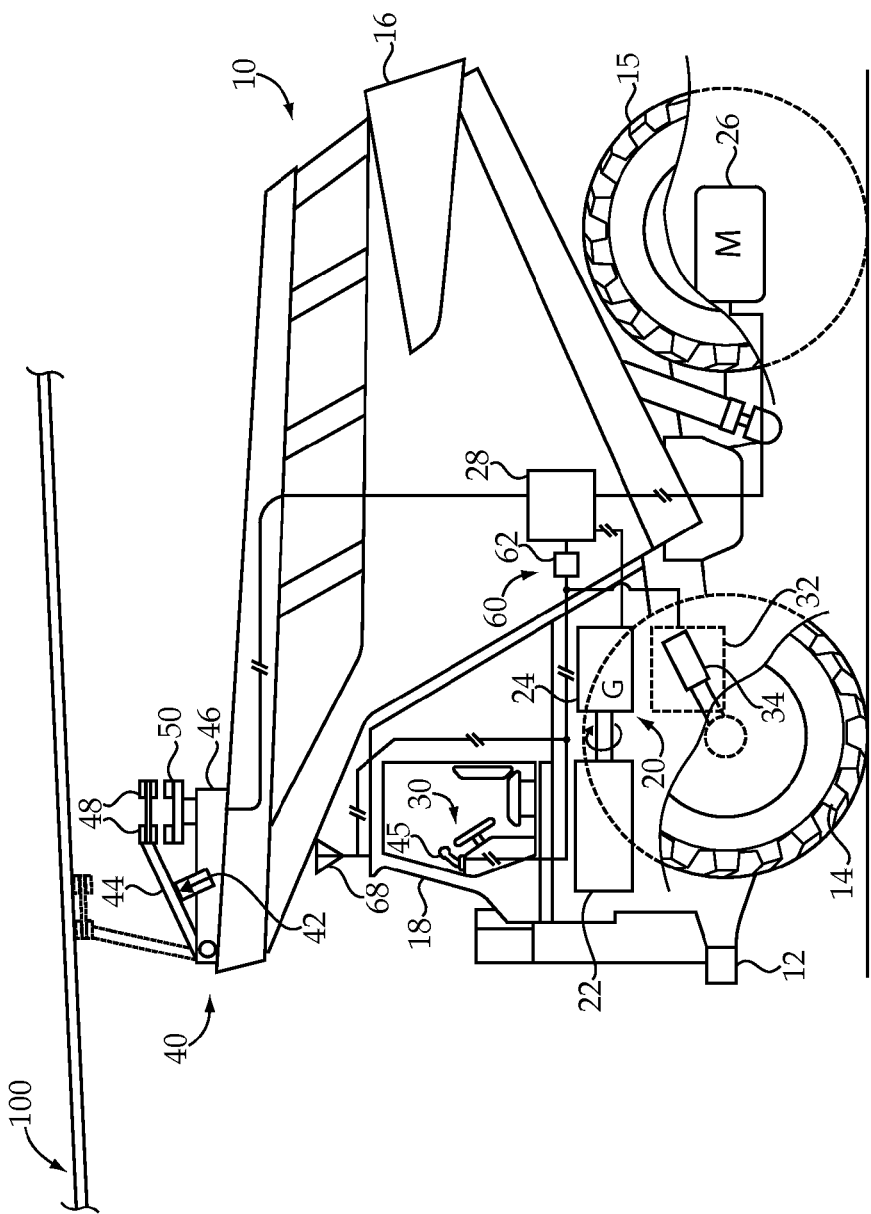
FIG. 1 is a side diagrammatic view of a mining truck, according to one embodiment.

Referring to FIG. 1, there is shown a trolley-assist capable mining truck 10 according to one embodiment. Mining truck 10 may include a frame 12 having a front set of ground engaging propulsion elements 14 and a back set of ground engaging propulsion elements 15, coupled with frame 12. In the illustrated embodiment, elements 14 include two front wheels, and elements 15 include a set of four back wheels, although the present disclosure is not thereby limited. A bed 16 is coupled with frame 12, and may be tilted between a lowered position, as shown, and a lifted position, to dump material from bed 16 in a conventional manner. Mining truck 10 may further include a propulsion system 20, of which ground engaging elements 14 and 15 are a part, and including a combustion engine 22, such as a compression ignition internal combustion engine, and a generator 24 powered via engine 22. Propulsion system 20 may further include one or more electric propulsion motors coupled with back wheels 15. Propulsion system 20 may still further include a pantograph 40 configured to electrically connect with an overhead trolley line 100.

As noted above, mining truck 10 may be trolley-assist capable. Those skilled in the art will be familiar with mining trucks configured to operate via electric power from an overhead trolley line in certain instances, such as when carrying a load of material on an uphill grade. In one practical implementation strategy, mining truck 10 may transition between an on-trolley mode where propulsion system 20 is receiving power entirely from overhead trolley line 100, and an off-trolley mode where power is received entirely from engine 22 and generator 24. Embodiments are also contemplated in which a blend of electrical power from trolley line 100 and engine 22/generator 24 is used in the on-trolley mode, or where mechanical power is provided from engine 22 to ground engaging elements 15 and/or 14 in either mode.

A cab 18 may be mounted to frame 12, and an operator control station 30 may be positioned within cab 18. Operator control station 30 may include a variety of operator input devices for controlling and monitoring operation of mining truck 10. Among these may be a switch 45, such as a push-button switch, control lever or other operator manipulable mechanism, which enables an operator to adjust mining truck 10, and in particular propulsion system 20, between an automated mode and a fully manual or partially manual mode. In an automated mode, raising and lowering of pantograph 40 may be controlled without the need for any manual action by an operator. Other features of propulsion system 20, such as engine 22 and generator 24 may be autonomously controlled to transition mining truck between the on-trolley mode and the off-trolley mode, as further described herein.

A position of switch 45 may thus determine whether mining truck 10 is operated in the on-trolley mode or the off-trolley mode, and also whether pantograph control is automated or given to the operator. Still another feature of mining truck which can be either manually or autonomously controlled is steering. Mining truck 10 may include a steering mechanism 32 having at least one steering actuator 34, such as a conventional hydraulic cylinder. A control system 60 may be coupled with steering mechanism 32, and includes an electronic control unit 62. Electronic control unit 62 may be in control communication with steering mechanism 32 to control a wheel steering angle of mining truck 10, in a manner further described herein. Electronic control unit 62 may further be configured to receive inputs from or interrogate switch 45 to determine a position thereof. An antenna 68 may be mounted upon frame 12 or bed 16, and receives data considered by electronic control unit 62 in executing various of the autonomous functions contemplated herein. Antenna 68 may notably receive electronic data indicative of a position of mining truck 10, in particular relative to various features and mechanisms at a mine site, the significance of which will be further apparent from the following description. Electronic control unit 62 may also be in communication with power electronics 28 and operable to configure electronics 28 appropriately for receiving electrical power from overhead trolley line 100, or alternatively from generator 24, or both. Electronics 28 may supply electrical power, regardless of the source, to propulsion motor 26 in a known manner.

Pantograph 40 may further include a linkage 44 coupled with a base 46 configured to mount to frame 12, for instance at a front of bed 16. Pantograph 40 may be adjustable by way of an actuating mechanism 42 between an on-trolley configuration for contacting trolley line 100, and a rest configuration. In the rest configuration, pantograph 40 may contact a rest 50 mounted to base 46. As illustrated in FIG. 1, the on-trolley configuration may include a raised position of pantograph 40, whereas the rest configuration may include a lowered position of pantograph 40. Pantograph 40 may include electrical contactors 48, configured to electrically connect overhead trolley line 100 with electronics 28, as alluded to above.

Figure 2:
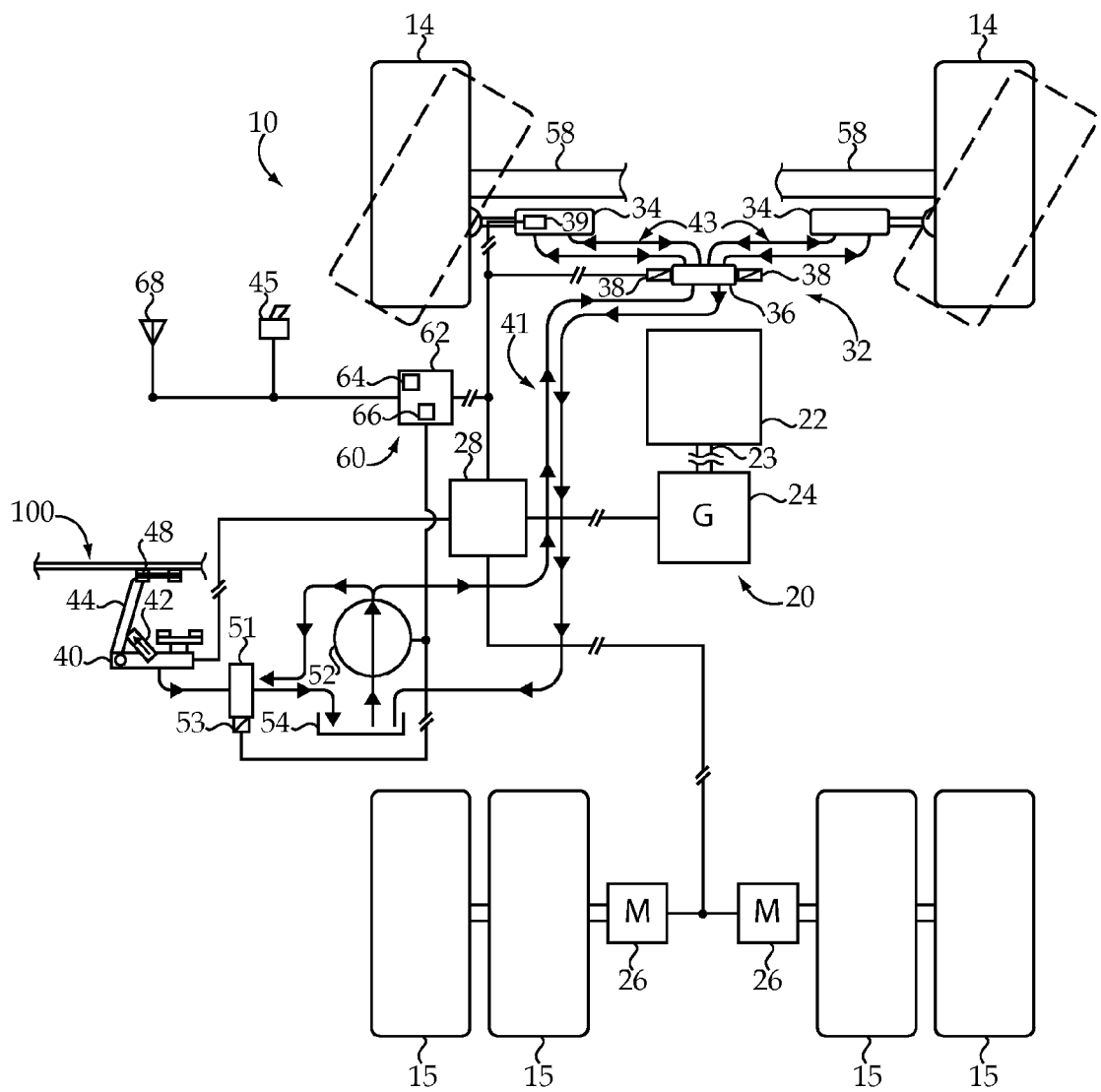
FIG. 2 is a schematic view of the mining truck of FIG. 1.

Referring now to FIG. 2, there is shown a schematic illustration of certain parts of mining truck 10, and illustrating features in addition to those shown in FIG. 1. It will be recalled that mining truck 10 may include at least one electric propulsion motor. In a practical implementation strategy, a separate electric propulsion motor 26 powers each of the two sets of back wheels 15. A common propulsion motor for both of the respective sets of wheels 15 might alternatively be used. Also shown in FIG. 2 is generator 24 coupled with engine 22. Generator 24 may be rotated via an output shaft 23 of engine 22. Other components (not shown) such as a transmission and a gearbox may be coupled between engine 22 and generator 24 in a conventional manner. Power electronics 28 are shown electrically connecting with generator 24 and propulsion motors 26, and also with pantograph 40. In particular, electronics 28 may be electrically connected with electrical contactors 48. Electronics 28 may include various components known to those skilled in the art, such as inverters, switches, and potentially a resistive grid for dissipating excess electrical power and an electrical energy storage device such as a battery or capacitor. Only one pantograph 40 is shown in FIGS. 1 and 2. It should be appreciated, however, that in many, if not most, implementations two pantographs each configured to electrically connect propulsion system 20 with energized trolley lines may be used. Trolley lines suitable for use in the context of the present disclosure may be either direct current or alternating current, and generator 24 may be configured as a conventional direct current generator. An AC generator or the like might alternatively be used. While a compression ignition internal combustion engine will typically comprise engine 22, in other embodiments a gas turbine engine, or a spark-ignited engine could alternatively be used.

Also shown in FIG. 2 is a hydraulic pump 52 configured to transition hydraulic fluid from a tank 54 to actuating mechanism 42 of pantograph 40. To this end, actuating mechanism may include a hydraulic actuator. An electrically actuated control valve 51 having one or more electrical actuators 53 may be positioned fluidly between pump 52 and actuating mechanism 42. Hydraulic fluid may be both supplied to actuating mechanism 42 and returned to tank 54 by way of adjusting a position of valve 51. Electronic control unit 62 may be in control communication with valve 51, and also in control communication with pump 52. Transitioning propulsion system 20 between the on-trolley mode and the off-trolley mode discussed above, may include outputting a control command to control valve 51, more particularly energizing or de-energizing, or otherwise changing an electrical energy state, of electrical actuator 53, such that valve 51 moves and pantograph 40 is raised or lowered as the case may be. In other embodiments, actuating mechanism 42 might include a pneumatic or electrical actuator, or a ball and screw drive, for instance.

Also shown in FIG. 2 are additional parts of steering mechanism 32. Mining truck 10 may be equipped with a steering actuator 34 coupled with each one of front wheels 14. A set of hydraulic conduits 41 may extend between pump 52 and tank 54 and an electrically actuated steering control valve 36 operably coupled with actuators 34. Steering control valve 36 may include one or more electrical actuators 38 configured to move steering control valve 36 in response to control commands from electronic control unit 62. Another set of hydraulic conduits 43 may extend between steering control valve 36 and actuators 34 such that fluid may be transitioned to and from a rod side chamber and a head side chamber of each one of actuators 34, as the case may be. Each of front wheels is shown coupled with a front axle 58, such as a one-piece or split front axle, in a conventional manner. A steering sensor 39 is shown coupled with one of actuators 34 and is in communication with electronic control unit 62. Sensor 39 may be a linear position sensor configured to monitor a position of the corresponding one of actuators 34, enabling electronic control unit 62 to monitor a wheel steering angle of mining truck 10 by way of known techniques. Those skilled in the art will appreciate that a variety of other techniques for monitoring wheel steering angle of mining truck 10 might be used, such as a rotary position sensor, or still another strategy. Steering mechanism 32 and electronic control unit 62 may together comprise a steering system of mining truck 10.

Electronic control unit 62 may be configured via appropriate software for executing various of the automated control functions contemplated herein. To this end, electronic control unit 62 may include a data processor 64 and a computer readable memory 66 storing computer executable code. In one embodiment, memory 66 may also store map data of an on-trolley suitability corridor, the significance of which will be apparent from the following description. It will be recalled that electronic control unit 62 is in communication with antenna 68. Antenna 68 may receive electronic data indicative of a real-time position of mining truck 10, such as from a global positioning system or a local positioning system. Electronic control unit 62 may use the real-time position data of truck 10 in comparison with the stored map data to determine when certain functions should or might be executed. As noted above, one such function may include automated steering of mining truck 10. It has been discovered that automated steering of mining truck 10 while electrically connected with, and during engaging with and disengaging from, a trolley line can provide efficiency improvements.

Figure 3:
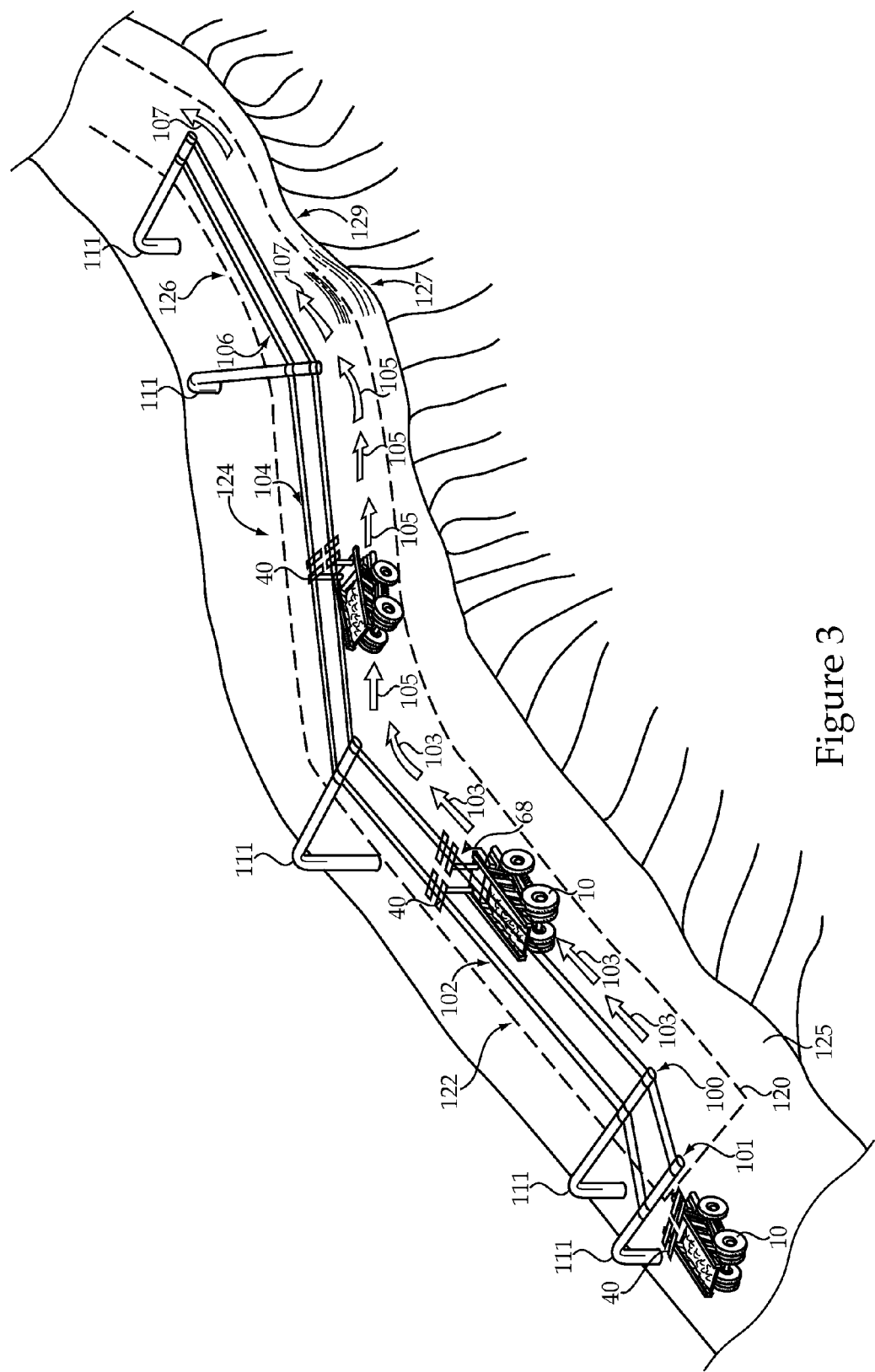
FIG. 3 is a diagrammatic view of a mining truck at several locations upon a haul road in a trolley-assisted mine environment.

Referring now to FIG. 3, there is shown mining truck 10 at three different locations upon a haul road 125. Trolley line 100 extends along haul road 125, roughly parallel therewith, and such that electrical wires and typically wire support cables of trolley line 100 are suspended above haul road via support poles 111. In a conventional manner, trolley line 100 may consist of a plurality of straight segments extending between support poles 111. In FIG. 3, at the leftmost position of mining truck 10 it is approaching a first or starting segment 101 of trolley line 100. Starting segment 101 is followed by a succeeding segment 102, a next succeeding segment 104, and yet another succeeding segment 106. Also shown in FIG. 3 is an on-trolley availability corridor 120 with which trolley line 100 coincides. Corridor 120 includes a first part 122 coinciding with segments 101 and 102 of trolley line 100. A second part 124 of corridor 120 coincides with segment 104, whereas a third part 126 coincides with segment 106. Each of the line segments may similarly be understood to coincide with the respective parts of corridor 120. Corridor 120 may be understood to define fixed boundaries upon haul road 125 which coincide with trolley line 100, generally being parallel thereto, and the fixed boundaries being based at least in part upon a tolerance for displacement of mining truck 10 from trolley line 100. Those skilled in the art will be familiar with the tolerance for displacement of an on-trolley capable mining truck side-to-side from an overhead trolley line. Rather than being restricted to a single linear path, the mining truck can typically steer left and right within a tolerance defined generally by a width of the electrical contactors of the pantograph(s). In other embodiments, the on-trolley availability corridor could be defined by a footprint of trolley line 100 without any tolerance for displacement, and such that mining truck 10 can follow only one path, parallel trolley line 100, in the on-trolley mode.

When traversing a haul road, a mining truck operating on-trolley will typically traverse a travel path which is inside the on-trolley availability corridor. While as noted above, some tolerance for steering of the mining truck will typically exist, an operator is still required to steer the mining truck within relatively tight constraints to avoid going off-trolley, electrically disconnecting the pantograph, and thus halting or slowing operation to rev up the engine and operate with on-board power, then return to the trolley line. Even where operation is not completely halted, for instance where on-board energy storage is used, faults generated via inadvertently steering off a trolley line can be otherwise problematic to the mining truck, the trolley line itself, and potentially even other equipment at the mine site which is associated with the trolley line. Operating on-trolley can also be fatiguing for an operator, as uphill hauls may often be several kilometers in length and take more than half an hour. For these and other reasons, automated control over steering, and over pantograph engagement and disengagement, can enable on-trolley operation to be more efficient, faster, more reliable, and less fatiguing for operators.

As mining truck 10 travels from the leftmost position shown in FIG. 3 to the succeeding position, pantograph 40 will typically have been raised and propulsion system 20 transitioned to the on-trolley mode. Mining truck 10 may be traversing first part 122 of corridor 120 at a first directional heading which is accordant with first corridor part 122. In FIG. 3, a first set of arrows 103 denotes generally the heading of mining truck 10 within first corridor part 122. A second set of arrows 105 denotes generally a heading of mining truck 10 within second corridor part 124, whereas a third set of arrows 107 denotes generally a heading of mining truck 10 within third corridor part 126. It will be recalled that mining truck 10, and in particular electronic control unit 62, may be receiving real-time truck position data while operating on-trolley, and typically while operating off-trolley. The present disclosure contemplates continuously or intermittently monitoring real-time position of mining truck 10 while on-trolley, and proactively steering mining truck 10 based upon known features of the on-trolley availability corridor, for instance the boundaries of the corridor and its directional changes.

To this end, when mining truck 10 is within first corridor part 122, electronic control unit 62 may receive data indicative of a prospective directional change in corridor 120 from first part 122 to second part 124. While map data of corridor 120 may be previously stored on memory 66, the real-time truck position data in conjunction with stored data may indicate that the directional change is prospective, in other words upcoming. It may be noted that segment 102 of trolley line 100 has a different orientation than succeeding segment 124. Accordingly, a directional change in corridor 120 may be defined by a difference in orientation between segments 102 and 104. Responsive to the received data indicative of the prospective directional change electronic control unit 62 may output a control command to steering mechanism 32, for instance a command to adjust a position of valve 36. Mining truck 10 may be steered responsive to the control command from the first heading accordant with first part 122 of corridor 120, toward a second heading accordant with second part 124 of corridor 120 which is to be traversed by mining truck 10. Descriptions herein of a heading being accordant with a given part of corridor 120 should be understood to mean that an instantaneous travel direction of mining truck 10, if maintained, would not result in mining truck 10 becoming electrically disconnected from trolley line 100 within that part of corridor 120. For instance, if mining truck 10 is traversing a travel path within a given part of corridor 120 that is parallel the coinciding trolley line segment, then the heading could be fairly said to be accordant with that part of the corridor. If mining truck 10 is traversing a travel path within a given part of corridor 120 that is not parallel the coinciding trolley line segment, but which will not lead mining truck far enough to the side of that trolley line segment that pantograph 40 electrically disconnects from trolley line 100 prior to reaching the end of that trolley line segment, then the heading could be fairly said to be accordant with the coinciding part of corridor 120. On the other hand, a heading which, if maintained, tends to lead mining truck 10 off the trolley line prior to reaching the end of the trolley line segment to which mining truck is presently connected, would likely not be accordant with the coinciding part of corridor 100. Given the foregoing examples, it will be appreciated that whether a heading is accordant with any part of the on-trolley availability corridor can depend upon the instantaneous location of mining truck 10. A directional heading might be accordant with the last 10% of one part of corridor 120, but not accordant with the last 20% of that part of corridor 120, for example.

As noted above, the directional change is a prospective directional change, meaning that the data is received and evaluated prior to mining truck reaching a part of corridor 120 which actually changes direction. In FIG. 3, the rightmost one of arrows 103 is curved, illustrating that mining truck 10 commences steering from the heading accordant with first part 122 of corridor 120 to the heading accordant with succeeding part 124, prior to electrically connecting pantograph 40 with trolley line 100 within segment 104. Another way to understand this principle is that mining truck 10 may commence steering toward a new heading prior to reaching a segment of trolley line 100 for which that heading is appropriate. As a result, mining truck 10 may be steered in an arc such that pantograph 40 slides transversely against trolley line 100, and commences the transverse sliding prior to mining truck 10 reaching the succeeding segment of trolley line 100. This strategy differs from earlier attempted autonomous techniques which sensed a trolley line directly, and would have been capable of steering a mining truck only after progressing from one segment of the trolley line to a succeeding, differently oriented segment, and detecting the changed direction.

As also noted above, computer readable memory 64 may store map data of corridor 120. The map data may be gathered at least in part by driving mining truck 10 within corridor 10 and accounting for the known tolerance for left and right displacement from trolley line 100, while electrically connected therewith. Surveying might also be used. By comparing truck position data with stored map data, electronic control unit 62 may thus determine where mining truck 10 is within corridor 120 at any time, and also where mining truck 10 is relative to upcoming directional changes. In addition to location data of corridor 120, memory 64 may store haul road profile data, including data indicative of certain feature of haul road 125 within corridor 120 which can effect optimal steering of mining truck 10. When driving a mining truck, or most vehicles for that matter, across a slope, if the vehicle is to be driven in a straight line, it is typically necessary to steer the vehicle modestly uphill. In other words, when driving sideways across a hill, if one wishes to maintain the vehicle at a constant elevation on the hill, the wheels typically should be at a nonzero steering angle. While it is generally desirable to prepare and maintain a haul road to be as flat as possible apart from uphill and downhill pitch, despite best efforts there are often irregularities in the slope of a haul road. Such irregularities may be present from the time of construction, or may develop over time. Such irregularities may include left or right rolls, dips, bumps, or other imperfections. In FIG. 3, a first roll feature 127 of haul road 125 slopes downwardly, or to the right of the general direction of corridor part 126, and a second roll feature 129 slopes in the opposite direction. Accordingly, mining truck 10 may need to be steered in response to roll features 127 and 129 even if straight line travel is desired. The stored haul road profile data may include data indicative of each of features 127 and 129. Namely, the data may be indicative of a roll parameter of haul road 125, including a location of a roll feature as well as its magnitude, such that appropriate commands may be sent to steering mechanism 32, in advance of reaching a roll feature. For instance, rather than detecting the downslope travel of mining truck 10 which might result from attempting to drive across feature 127 at a steering angle of zero, just prior to reaching feature 127, mining truck 10 might be steered slightly to the left. An opposite procedure might be used just prior to reaching feature 129.

INDUSTRIAL APPLICABILITY

Figure 4:
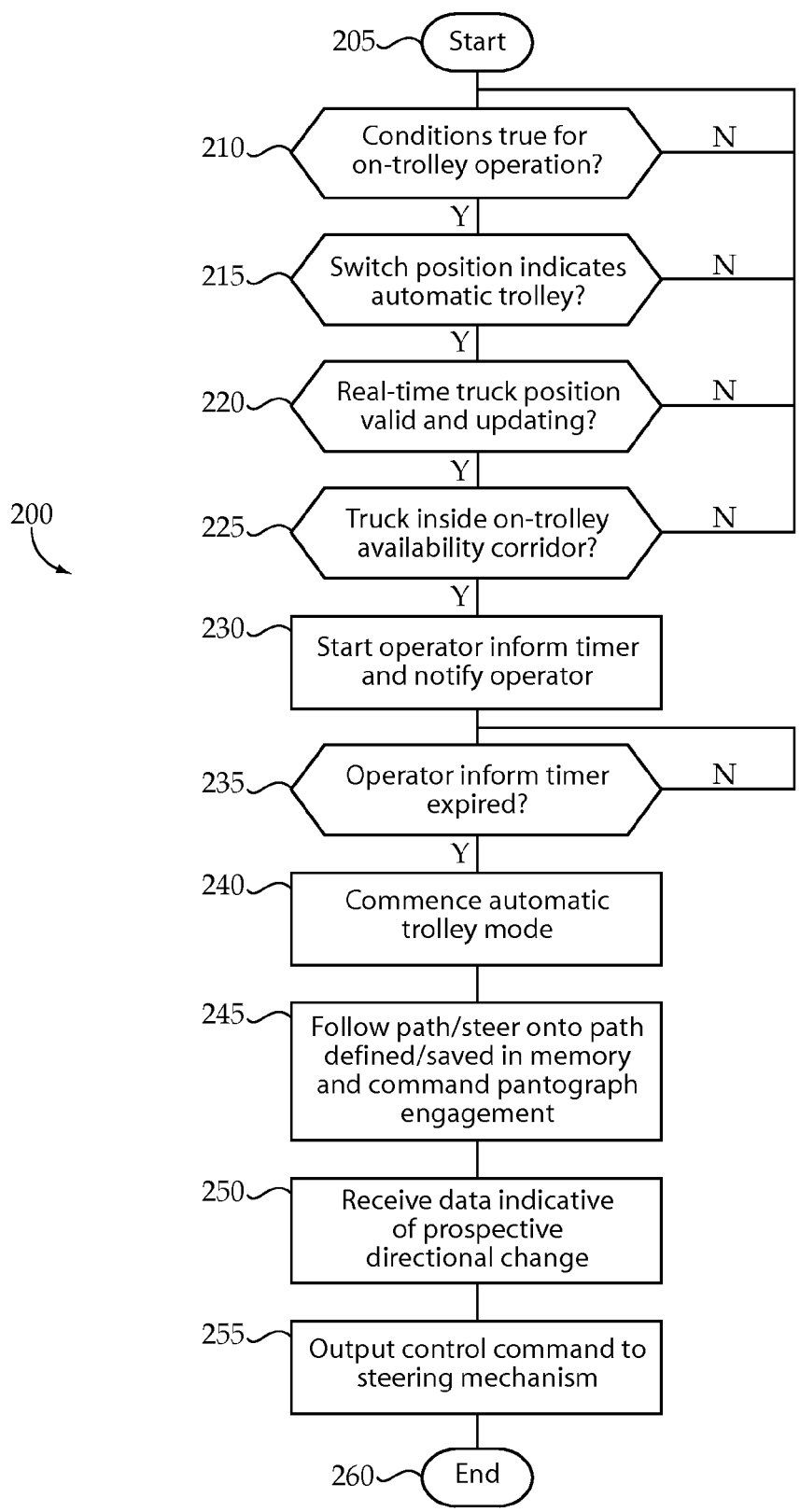
FIG. 4 is a flowchart illustrating a control process according to one embodiment.

Referring now to FIG. 4, there is shown a flowchart 200 illustrating an example control process according to the present disclosure. The process of flowchart 200 may start at step 205 and proceed to step 210 to query whether conditions are true for on-trolley operation. The truck conditions of interest at step 210 may include dynamic parameters such as speed, steering, position, and possibly others. These conditions at step 210 might also include whether or not mining truck 10 has been assigned to operate on-trolley or instead only off-trolley. It has been observed that certain trucks, or certain operators, may utilize trolley-assist more effectively than others despite best efforts in operator training and mining truck maintenance and equipment. For this reason, certain trucks may never operate on-trolley, or may not do so in the course of a given work shift, despite being capable of operating on-trolley. From step 210, the process may proceed to step 215 to query whether switch position, such as a position of switch 45, indicates automatic trolley. If yes, the process may proceed to step 220 to query whether real-time truck position is valid and updating. From step 220, the process may proceed to step 225 to query whether the truck is inside the on-trolley availability corridor. If any of steps 210-225 is false, the process may return to execute step 210 and steps subsequent again. If mining truck 10 is inside the on-trolley availability corridor at step 225, the process may proceed to step 230 to start an operator inform timer and notify the operator that automatic trolley control is to commence. From step 230, the process may proceed to step 235 to query whether the operator inform timer is expired. If no, the process may return to execute step 235 again. If yes, the process may proceed to step 240 to commence automatic control mode.

From step 240, the process may proceed to step 245 where mining truck 10 will follow a predefined path, or steer onto a path defined by or saved in memory and within corridor 120, and also command pantograph engagement. The path might be linear and parallel trolley line 100, linear and non-parallel trolley line 100, or non-linear. Accordingly, at step 245, control commands may be sent if needed to maintain a steering angle, or adjust a steering angle, of mining truck 10 and to engage pantograph 40. From step 245, the process may proceed to step 250 to receive data indicative of a prospective directional change in the on-trolley availability corridor. From step 250, the process may proceed to step 255 to output a control command to steering mechanism 32 such that mining truck 10 is steered from a first heading as described herein toward a second heading. The first and second headings may be parallel the corresponding segments of trolley line 100. From step 225, the process may end at step 260.

The process of flowchart 200 sets forth example control procedures which might be used where mining truck 10 is engaging with trolley line 100, and thus autonomously actuating pantograph 40 and steering onto or following a path suitable for on-trolley operation. Where mining truck 10 is to disconnect from trolley line 100, for example, at the end of trolley line 100 near the end of an uphill grade, pantograph 40 may be autonomously lowered or the operator signaled to lower pantograph 40, and steering control may be handed back to the operator.

It will be noted that information relating to location of mining truck 10 in proximity to trolley line 100 and/or corridor 120 is used in a feed-forward manner to proactively commence steering prior to conditions necessitating those actions actually occurring. Mining truck 10 may thus begin to steer prior to a point in time at which a changed heading is necessary. This capability generally allows smoother, faster, and tighter control over travel direction of mining truck 10 than a system relying upon feedback as to a location of the pantograph relative to the trolley line.

Similar advantages result from automating pantograph control, as pantograph 40 may commence raising prior to mining truck 10 actually reaching a location at which electrical connection with trolley line 100 is possible. In a related aspect, propulsion system 20 may be proactively adjusted to avoid work stoppage and even damage to trolley line 100. It has been observed that operators sometimes steer off the trolley line, to avoid obstacles for instance, and then attempt to steer back onto the trolley line and end up snagging the trolley line and damaging it. Where monitored conditions suggest that mining truck 10 is about to drive off trolley line 100, unwittingly disconnect pantograph 40, and generate a fault either by way of the disconnection or by attempting to drive back onto the line, electronic control unit 62 may proactively command lowering pantograph 40. The monitored conditions might include operator initiated steering of mining truck 10. For instance, an operator may decide to take over steering of mining truck 10 where she sees an obstacle on haul road 125. Where the operator initiated steering adjusts a steering angle of mining truck 10 such that it appears that mining truck 10 is to be steered off of trolley line 100, steering inputs to electronic control unit 62 may be interpreted as a steering override command indicative of a fault, and electronic control unit 62 may responsively command lowering pantograph 40.

The present description is or illustrative purposes only, and should not be construed to narrow the breadth of the present disclosure in any way. Thus, those skilled in the art will appreciate that various modification might be made to the presently disclosed embodiments without departing from the full and fair scope and spirit of the present disclosure. Other aspects, features and advantages will be apparent upon an examination of the attached drawings and appended claims.

What is claimed is:

1. A method of operating a trolley assist-capable mining truck comprising the steps of:
  receiving data via an electronic control unit indicative of a prospective directional change in an on-trolley availability corridor to be traversed by the mining truck while electrically connected with an overhead trolley line coinciding with the corridor;
  outputting a control command via the electronic control unit to a steering mechanism of the mining truck responsive to the data; and
  steering the mining truck via the steering mechanism responsive to the control command from a first heading accordant with a first part of the corridor preceding the directional change, toward a second heading accordant with a second part of the corridor succeeding the directional change, and such that the steering commences while the mining truck is within the first part of the corridor.

2. The method of claim 1 further comprising a step of powering an electric propulsion motor of the mining truck via electric power from the overhead trolley line during transitioning from the first part to the second part of the corridor.

3. The method of claim 2 further comprising the steps of receiving a steering override command indicative of a fault, and responsively commanding lowering the pantograph.

4. The method of claim 2 wherein the step of outputting includes outputting the control command to an electrically actuated control valve for at least one steering cylinder of the steering mechanism.

5. The method of claim 4 wherein the data includes data indicative of a real-time location of the mining truck, and stored map data of the on-trolley availability corridor.

6. A method of operating a trolley assist-capable mining truck comprising the steps of:
  receiving data indicative of a prospective directional change in an on-trolley availability corridor to be traversed by the mining truck while electrically connected with an overhead trolley line coinciding with the corridor;

outputting a control command to a steering mechanism of the mining truck responsive to the data;

steering the mining truck responsive to the control command from a first heading accordant with a first s art of the corridor succeeding the directional change toward a second heading accordant with a second part of the corridor succeeding the directional change; and powering an electric propulsion motor of the mining truck via electric power from the overhead trolley line during transitioning from the first part to the second part of the corridor;

wherein the directional change is defined by a difference in orientation between a first linear segment and a succeeding linear segment, of the overhead trolley line, coinciding with the first and second parts of the corridor, respectively.

7. The method of claim 6 wherein the first heading and the second heading are parallel the first and the succeeding linear segments, respectively.

8. The method of claim 6 wherein:

the corridor defines fixed boundaries upon a haul road coinciding with the overhead trolley line, the fixed boundaries being based at least in part upon a tolerance for displacement of the mining truck from the overhead trolley line; and the step of steering further includes steering the mining truck in an arc such that a pantograph of the mining truck slides transversely against the overhead trolley line.

9. A trolley assist-capable mining truck comprising:

a frame;

a plurality of ground engaging wheels coupled with the frame;

a steering system including a wheel steering mechanism and an electronic control unit in control communication with the wheel steering mechanism;

the electronic control unit being configured to receive data indicative of a prospective directional change in an on-trolley availability corridor for electrically powering the mining truck via an overhead trolley line; and the electronic control unit being further configured to output a control command to the wheel steering mechanism responsive to the data, such that the mining truck is steered from a first heading accordant with a first part of the corridor preceding the directional change, toward a second heading accordant with a second part of the corridor succeeding the directional change, while within the first part of the corridor and electrically connected with the overhead trolley line.

10. The mining truck of claim 9 further comprising a propulsion system including a generator, an electric propulsion motor, and a pantograph configured to electrically connect the propulsion system with the overhead trolley line.

11. The mining truck of claim 10 wherein the wheel steering mechanism includes a first and a second hydraulic actuator coupled with a first and a second one of the ground engaging wheels, respectively, and at least one electrically actuated control valve operably coupled with the first and second hydraulic actuators and movable responsive to the control command.

12. The mining truck of claim 10 further comprising a receiver configured to receive real-time location data of the mining truck.

13. The mining truck of claim 12 further comprising a computer readable memory coupled with the electronic control unit and storing map data of the on-trolley availability corridor.

14. The mining truck of claim 13 wherein the data indicative of the prospective directional change includes the location data and the map data, and the electronic control unit is further configured to determine the control command responsive to a difference between the location data and the map data.

15. A steering system for a trolley assist-capable mining truck comprising:

a steering mechanism configured to adjust a wheel steering angle of the mining truck;

an electronic control unit configured to receive data indicative of a prospective directional change in an on-trolley availability corridor, the on-trolley availability corridor being defined by a tolerance for displacement of the mining truck from an overhead trolley line; and the electronic control unit being further configured to output a control command to the steering mechanism such that the mining truck is steered from a first heading toward a second heading, prior to reaching the directional change in the on-trolley availability corridor;

wherein the directional change is defined by a difference in orientation between adjacent segments of the overhead trolley line, and wherein the electronic control unit is further configured to output the control command such that the mining truck is steered toward the second heading prior to electrically connecting a pantograph of the mining truck with the succeeding segment.

16. The steering system of claim 15 further comprising a computer readable memory coupled with the electronic control unit and storing map data of the on-trolley availability corridor, and a receiver configured to receive real-time location data of the mining truck, and wherein the electronic control unit is further configured to output the control command responsive to the map data and the real-time location data.

17. The steering system of claim 16 wherein the computer readable memory stores haul road profile data for a plurality of locations upon a haul road coinciding with the overhead trolley line, and wherein the electronic control unit is further configured to output the control command responsive to the haul road profile data.

18. The steering system of claim 17 wherein the haul road profile data includes data indicative of a roll parameter of the haul road.

* * * * *

UNITED STATES PATENT AND TRADEMARK OFFICE
CERTIFICATE OF CORRECTION

| | | |
|---|---|---|
| PATENT NO. | : 8,577,530 B2 | Page 1 of 1 |
| APPLICATION NO. | : 13/308804 | |
| DATED | : November 5, 2013 | |
| INVENTOR(S) | : Ruth et al. | |

It is certified that error appears in the above-identified patent and that said Letters Patent is hereby corrected as shown below:

Title Page, Column 1, Item No. 75, (Inventors), line 1, delete "Eric Ruth," and insert
-- Eric J. Ruth, --.

In the Claims

Column 11, lines 7-8, in Claim 6, delete "first s art of the corridor succeeding the directional change" and insert -- first part of the corridor preceding the directional change, --.

Signed and Sealed this
Fifteenth Day of September, 2015

Michelle K. Lee
*Director of the United States Patent and Trademark Office*